US009711000B2

(12) United States Patent
Little

(10) Patent No.: US 9,711,000 B2
(45) **Date of Patent: *Jul. 18, 2017**

(54) METHOD OF GAMING, A GAMING SYSTEM AND A GAME CONTROLLER

(71) Applicant: Aristocrat Technologies Australia Pty Limited, North Ryde, NSW (AU)

(72) Inventor: David C. Little, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,544

(22) Filed: May 19, 2016

(65) Prior Publication Data

US 2016/0260284 A1 Sep. 8, 2016

Related U.S. Application Data

(63) Continuation of application No. 14/102,221, filed on Dec. 10, 2013, now Pat. No. 9,349,258, which is a continuation of application No. 12/620,032, filed on Nov. 17, 2009, now Pat. No. 8,616,954.

(60) Provisional application No. 61/117,386, filed on Nov. 24, 2008.

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.

CPC ...... *G07F 17/3213* (2013.01); *G07F 17/3265* (2013.01); *G07F 17/34* (2013.01)

(58) Field of Classification Search

CPC ........................ G07F 17/3262; G07F 17/3265
USPC ...................................................... 463/16–20
See application file for complete search history.

(56) References Cited

U.S. PATENT DOCUMENTS

| | | | |
|---|---|---|---|
| 4,643,429 | A | 2/1987 | Crandon et al. |
| 4,777,693 | A | 10/1988 | Diba et al. |
| 4,928,973 | A | 5/1990 | Perry et al. |
| 5,327,485 | A | 7/1994 | Leaden |
| 5,398,933 | A | 3/1995 | Thompson et al. |
| 5,628,511 | A | 5/1997 | Jacoby |
| 5,934,671 | A | 8/1999 | Harrison |
| 6,036,190 | A | 3/2000 | Edmunds et al. |
| 6,311,976 | B1 | 11/2001 | Yoseloff et al. |

(Continued)

FOREIGN PATENT DOCUMENTS

| | | |
|---|---|---|
| EP | 1469432 | 10/2004 |
| GB | 190607857 | 0/1906 |

(Continued)

*Primary Examiner* — Michael Cuff
(74) *Attorney, Agent, or Firm* — McAndrews, Held & Malloy, Ltd.

(57) ABSTRACT

A gaming system, game controller and method of gaming implementing a game wherein one or more symbols are selected to be retained from a previous game outcome based on symbols which contribute to a winning symbol combination in the game outcome. One or more subsequent game outcomes can be generated including the retained symbols. The retained symbols from a previous game outcome can be selected from symbols which contribute to a winning symbols combination in the previous game outcome. In the subsequent game outcome, the retained symbols can contribute to further winning symbol combinations.

10 Claims, 12 Drawing Sheets

(56) References Cited

U.S. PATENT DOCUMENTS

| | | | |
|---|---|---|---|
| 6,322,309 | B1 | 11/2001 | Thomas et al. |
| 6,651,984 | B1 | 11/2003 | Luken |
| 2002/0025847 | A1 | 2/2002 | Thomas et al. |
| 2003/0119581 | A1 | 6/2003 | Cannon |
| 2003/0124498 | A1 | 7/2003 | Ngomsi |
| 2004/0072607 | A1 | 4/2004 | Thomas et al. |
| 2004/0092300 | A1 | 5/2004 | Gauselmann |
| 2004/0102237 | A1 | 5/2004 | Baerlocher |
| 2004/0171416 | A1 | 9/2004 | Baerlocher |
| 2004/0185930 | A1 | 9/2004 | Thomas et al. |
| 2005/0035550 | A1 | 2/2005 | Jackson |
| 2005/0079908 | A1* | 4/2005 | Pacey ................. G07F 17/3262 463/20 |
| 2005/0107154 | A1 | 5/2005 | Pacey |
| 2005/0119043 | A1 | 6/2005 | Berman et al. |
| 2005/0181867 | A1 | 8/2005 | Thomas et al. |
| 2005/0288094 | A1 | 12/2005 | Marks et al. |
| 2006/0030403 | A1 | 2/2006 | Lafky et al. |
| 2006/0033281 | A1 | 2/2006 | Wong |
| 2006/0046816 | A1 | 3/2006 | Walker et al. |
| 2006/0068893 | A1 | 3/2006 | Jaffe et al. |
| 2006/0116190 | A1 | 6/2006 | Baerlocher |
| 2006/0116194 | A1 | 6/2006 | Pacey et al. |
| 2006/0211465 | A1 | 9/2006 | Moshal |
| 2007/0021179 | A1* | 1/2007 | Kobayashi .......... G07F 17/3211 463/16 |
| 2007/0077980 | A1 | 4/2007 | Marks et al. |
| 2007/0213119 | A1 | 9/2007 | Baerlocher |
| 2007/0235932 | A1 | 10/2007 | Karwat et al. |
| 2007/0265051 | A1 | 11/2007 | Tarantino |
| 2007/0265062 | A1 | 11/2007 | Thomas et al. |
| 2008/0015011 | A1 | 1/2008 | Gauselmann |
| 2008/0039174 | A1* | 2/2008 | Litman ........................... 463/20 |
| 2008/0064491 | A1 | 3/2008 | Taylor |
| 2008/0070681 | A1 | 3/2008 | Marks et al. |
| 2008/0113760 | A1 | 5/2008 | Baerlocher |
| 2008/0167113 | A1 | 7/2008 | Plowman |
| 2008/0188276 | A1 | 8/2008 | Schneider |
| 2008/0197573 | A1 | 8/2008 | Palmer |
| 2009/0117978 | A1* | 5/2009 | Dias Pires .......... G07F 17/3244 463/20 |
| 2009/0137311 | A1* | 5/2009 | Iverson ............... G07F 17/3213 463/20 |
| 2009/0227353 | A1* | 9/2009 | Yoshizawa .......... G07F 17/3267 463/20 |
| 2010/0075736 | A1* | 3/2010 | Muir ....................... G07F 17/32 463/20 |
| 2010/0298041 | A1* | 11/2010 | Berman .............. G07F 17/3265 463/20 |
| 2011/0053675 | A1* | 3/2011 | Aoki .................. G07F 17/3202 463/20 |
| 2011/0111824 | A1* | 5/2011 | Cuddy ................ G07F 17/3239 463/20 |

FOREIGN PATENT DOCUMENTS

| | | |
|---|---|---|
| GB | 2101380 | 1/1983 |
| GB | 2369916 | 6/2002 |
| GB | 2390822 | 1/2004 |
| GB | 2401324 | 11/2004 |
| GB | 2416902 | 2/2006 |
| GB | 2418869 | 4/2006 |
| JP | 2004097511 | 4/2004 |
| JP | 2004254927 | 9/2004 |
| JP | 2005095689 | 4/2005 |
| JP | 2005237693 | 9/2005 |
| JP | 2005237744 | 9/2005 |
| JP | 2006122260 | 5/2006 |
| JP | 2006158580 | 6/2006 |
| NZ | 334630 | 6/2002 |
| WO | 9413374 | 6/1994 |
| WO | 9734105 | 9/1997 |
| WO | 03095044 | 11/2003 |
| WO | 2005079936 | 9/2005 |
| WO | 2006017512 | 2/2006 |
| WO | 2006052213 | 5/2006 |
| WO | 2006104731 | 10/2006 |
| WO | 2007123922 | 11/2007 |
| WO | 2007133124 | 11/2007 |
| WO | 2007147203 | 12/2007 |
| WO | 2008088542 | 7/2008 |

* cited by examiner

801

| | | | | |
|---|---|---|---|---|
| A | K | 10 | 7 | 3 |
| 8 | 9 | **Q** 812 | 4 | 6 |
| 7 | **K** 811 | 8 | **J** 813 | 5 |
| **A** 810 | 10 | 5 | 3 | **10** 814 |

Figure 8a

802

| | | | | |
|---|---|---|---|---|
| 10 | 5 | 4 | 3 | 7 |
| 8 | 9 | **Q** 812 | 4 | 5 |
| **K** 820 | **K** 811 | **J** 821 | **J** 813 | **J** 823 |
| **A** 810 | 9 | 6 | Q | **10** 814 |

Figure 8b

803

| | | | | |
|---|---|---|---|---|
| **6** 830 | **6** 831 | 3 | **6** 832 | **6** 833 |
| 7 | 10 | **Q** 812 | 5 | K |
| **K** 820 | **K** 811 | **J** 821 | **J** 813 | **J** 823 |
| **A** 810 | 4 | 9 | 7 | **10** 814 |

Figure 8c

901

| | | | | |
|---|---|---|---|---|
| A | K | 10 | 7 | 3 |
| 8 | 9 | **Q** 912 | 4 | 6 |
| 7 | **K** 911 | 8 | **J** 913 | 5 |
| **A** 910 | 10 | 5 | 3 | **10** 914 |

Figure 9a

902

| | | | | |
|---|---|---|---|---|
| 10 | 5 | 4 | 3 | 7 |
| 8 | 9 | **A** 921 | 4 | 5 |
| K | **A** 920 | J | **10** 922 | J |
| **A** 910 | **K** 911 | **Q** 912 | **J** 913 | **10** 914 |

Figure 9b

903

| | | | | |
|---|---|---|---|---|
| 5 | 6 | 3 | 7 | 4 |
| **A** 930 | 10 | 4 | 8 | **A** 931 |
| 6 | **A** 920 | **A** 921 | **10** 922 | 7 |
| **A** 910 | **K** 911 | **Q** 912 | **J** 913 | **10** 914 |

Figure 9c

904

| | | | | |
|---|---|---|---|---|
| 5 | **WILD** 940 | 8 | 4 | 7 |
| 9 | 7 | 5 | 8 | 3 |
| **A** 930 | **A** 920 | **A** 921 | **10** 922 | **A** 931 |
| **A** 910 | **K** 911 | **Q** 912 | **J** 913 | **10** 914 |

Figure 9d

1001

| | | | | |
|---|---|---|---|---|
| apple | 2 | 8 | lemon | 3 |
| 8 | **cherries** 1010 | **cherries** 1011 | **WILD** 1012 | 6 |
| 7 | 4 | 3 | 9 | 5 |
| 6 | 10 | 5 | plum | 8 |

Figure 10a

1002

| | | | | |
|---|---|---|---|---|
| 10 | 5 | 4 | 3 | 7 |
| 8 | **cherries** 1010 | **cherries** 1011 | **WILD** 1012 | 5 |
| **orange** 1020 | **orange** 1021 | 6 | 2 | **WILD** 1022 |
| cherries | plum | 3 | 4 | 10 |

Figure 10b

1003

| | | | | |
|---|---|---|---|---|
| 5 | 6 | 3 | 7 | 4 |
| **cherries** 1033 | **cherries** 1010 | **cherries** 1011 | **WILD** 1012 | 8 |
| **apple** 1030 | 3 | **apple** 1031 | **apple** 1032 | 6 |
| 6 | 9 | 4 | 9 | 5 |

Figure 10c

1101

| | | | | |
|---|---|---|---|---|
| apple | 2 | 8 | lemon | 3 |
| 8 | **cherries** 1110 | **cherries** 1111 | **WILD** 1112 | 6 |
| 7 | 4 | 3 | 9 | orange |
| 6 | 10 | 5 | plum | 8 |

Figure 11a

1102

| | | | | |
|---|---|---|---|---|
| 10 | 5 | 4 | 3 | 7 |
| 8 | 2 | **cherries** 1122 | orange | lemon |
| orange | **cherries** 1121 | 6 | 2 | 9 |
| **cherries** 1120 | **cherries** 1110 | **cherries** 1111 | **WILD** 1112 | 4 |

Figure 11b

1103

| | | | | |
|---|---|---|---|---|
| 5 | 6 | 3 | 7 | 4 |
| 4 | 10 | 2 | 5 | 8 |
| **orange** 1130 | **orange** 1131 | **orange** 1132 | plum | 7 |
| **cherries** 1120 | **cherries** 1110 | **cherries** 1111 | **WILD** 1112 | 5 |

Figure 11c

1301

| | | | | |
|---|---|---|---|---|
| apple | 2 | 8 | lemon | 3 |
| 8 | **cherries** 1310 | **cherries** 1311 | 4 | 6 |
| 7 | 4 | 3 | 9 | 5 |
| 6 | 10 | 5 | plum | 8 |

Figure 13a

1302

| | | | | |
|---|---|---|---|---|
| 10 | 5 | 4 | 3 | 7 |
| 8 | **cherries** 1310 | **cherries** 1311 | **WILD** 1320 | 5 |
| **orange** 1321 | **orange** 1322 | **orange** 1323 | 2 | 9 |
| lemon | plum | 6 | 4 | WILD |

Figure 13b

1303

| | | | | |
|---|---|---|---|---|
| 5 | cherries | 3 | 7 | 4 |
| 4 | 10 | 2 | 5 | 8 |
| **orange** 1321 | **orange** 1322 | **orange** 1323 | **orange** 1340 | 7 |
| 9 | 6 | cherries | 8 | 3 |

Figure 13c

METHOD OF GAMING, A GAMING SYSTEM AND A GAME CONTROLLER

RELATED APPLICATIONS

This application is a continuation of U.S. application Ser. No. 14/102,221, filed Dec. 10, 2013, expected to issue as U.S. Pat. No. 9,349,258 on May 24, 2016, which is a continuation of U.S. application Ser. No. 12/620,032, filed Nov. 17, 2009, now U.S. Pat. No. 8,636,581 issued Jan. 28, 2014, which claims priority to U.S. Provisional Patent Application No. 61/117,386 having a filing date of Nov. 24, 2008. The above-identified applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a method of gaming, a gaming system and a game controller.

It is known to provide a gaming system including a gaming controller arranged to generate a random result and apply game rules to the result to determine a game outcome for which a player may be awarded a prize if a predetermined winning outcome occurs.

While such gaming systems provide users with enjoyment, a need exists for alternative gaming systems in order to maintain or increase player enjoyment.

BRIEF SUMMARY OF THE INVENTION

According to a first aspect there is provided a method of gaming comprising the steps of:

a) selecting one or more symbols to retain from a symbol set of a game outcome based on the selected symbols contributing to a winning symbol combination in the game outcome; and b) selecting a further set of symbols for display as a subsequent game outcome including the retained selected symbols.

The method can further comprise initial steps of selecting an initial set of symbols, displaying a game outcome using the initial set of symbols, and evaluating any winning symbol combinations in the game outcome, wherein the symbols to retain for the subsequent game outcome are selected from the initial game outcome.

Some embodiments of the method further comprises the step of:

c) evaluating the further set of symbols to identify one or more winning symbol combinations of the subsequent game outcome.

Some embodiments include the step of awarding a prize based on winning symbol combinations of the subsequent game outcome.

In some embodiments at least one winning symbol combination of a subsequent game outcome includes one or more of the selected symbols which contributed to a winning symbol combination of the initial game outcome.

In one embodiment the retained selected symbols relate to a highest winning symbol combination of the game outcome from which they are selected.

In an alternative embodiment the retained selected symbols relate to a winning symbol combination of the game outcome selected by the player.

In one embodiment the further set of symbols comprises symbols of a plurality of groups and further comprising the step of displaying the set of symbols comprising symbols of a plurality of groups in respective ones of display positions.

In one variation based on the above embodiment each retained symbol is displayed in the subsequent game outcome in a display position the same as a display position in the game outcome from which the symbol was selected.

In an alternative variation based on the above embodiment each retained symbol is displayed in the subsequent game outcome in a display position defined for the symbol group.

In some embodiments steps a) to c) are repeated to generate a further subsequent outcome. The selected symbols to retain for each subsequent outcome can include the previously retained symbols. Alternatively, the symbols to retain for each subsequent outcome are selected independent of whether or not the selected symbols have been retained previously.

Some embodiments include the step of awarding a prize based on winning combinations of the further subsequent game outcome.

In some embodiments further subsequent outcomes are generated until an end condition is met. For example, the condition can be a given number of repetitions. Alternatively the end condition can be a given game outcome occurring.

A prize can be awarded based on winning combinations of the subsequent game outcome when the end condition is met.

According to another aspect there is provided a game controller comprising a symbol selector arranged to select one or more symbols of a game outcome, which contribute to a winning combination in the game outcome to retain for a subsequent game outcome, and select a further set of symbols, including the retained symbols, for a subsequent game outcome.

The symbol selector can be further arranged to select a set of symbols without any retained symbols for a game outcome.

In an embodiment the game controller further comprises an outcome evaluator arranged to evaluate the set of symbols selected for a game outcome to identify any one or more winning symbol combinations occurring in the game outcome.

In an embodiment the set of symbols comprises symbols of a plurality of groups and the game controller further comprises a display controller arranged to display the set of symbols as a game outcome comprising symbols of a plurality of groups in respective ones of display positions.

The game controller can be adapted to cause each symbol retained from a previous game outcome is displayed in a display position in a subsequent game outcome which is the same as the display position for the symbol in the previous game outcome.

Alternatively, the game controller can be adapted to cause each symbol retained from a previous game outcome is displayed in a subsequent game outcome in a display position defined for the symbol group.

The outcome evaluator can be further arranged to determine an award based on winning symbol combinations of the game outcome.

According to another aspect there is provided a gaming system comprising:

a player interface for entering game play instructions by a player and including a display for displaying game outcome and prize information to the player; and a symbol selector arranged to select one or more symbols of a game outcome, which contribute to a winning combination in the game outcome to retain for a subsequent game outcome, and select a further set of symbols, including the retained symbols, for a subsequent game outcome.

The symbol selector can be further arranged to select a set of symbols without any retained symbols for a game outcome.

The gaming system can further comprise an outcome evaluator arranged to evaluate a set of symbols selected for a game outcome to identify any one or more winning symbol combinations occurring in the game outcome.

An embodiment of the gaming system further comprises a display controller, wherein the set of symbols comprises symbols of a plurality of groups and the display controller is arranged to display the set of symbols as a game outcome comprising symbols of a plurality of groups in respective ones of display positions.

In this embodiment each symbol retained from a previous game outcome can be displayed in a display position in a subsequent game outcome which is the same as the display position for the symbol in the previous game outcome.

Alternatively each symbol retained from a previous game outcome can be displayed in a subsequent game outcome in a display position defined for the symbol group.

In some embodiments the outcome evaluator is further arranged to determine an award based on winning symbol combinations of the game outcome.

According to another aspect there is provided computer program code which when executed causes a computer to implement a computer controlled gaming method as described above.

Another aspect provides a computer readable medium comprising the above program code.

Another aspect provides a data signal comprising the above program code.

Another aspect provides transmitting and receiving the above data signal.

BRIEF DESCRIPTION OF SEVERAL VIEWS OF THE DRAWINGS

An exemplary embodiment of the invention will now be described with reference to the accompanying drawings in which:

FIGS. 8*a*-8*c* illustrate game outcomes of a first example;

FIGS. 9*a*-9*d* illustrate game outcomes of a second example;

FIGS. 10*a*-10*c* illustrate game outcomes of a third example;

FIGS. 11*a*-11*c* illustrate game outcomes of a fourth example;

FIGS. 13*a*-13*c* illustrate game outcomes of a sixth example.

DETAILED DESCRIPTION OF THE INVENTION

Figure 1:
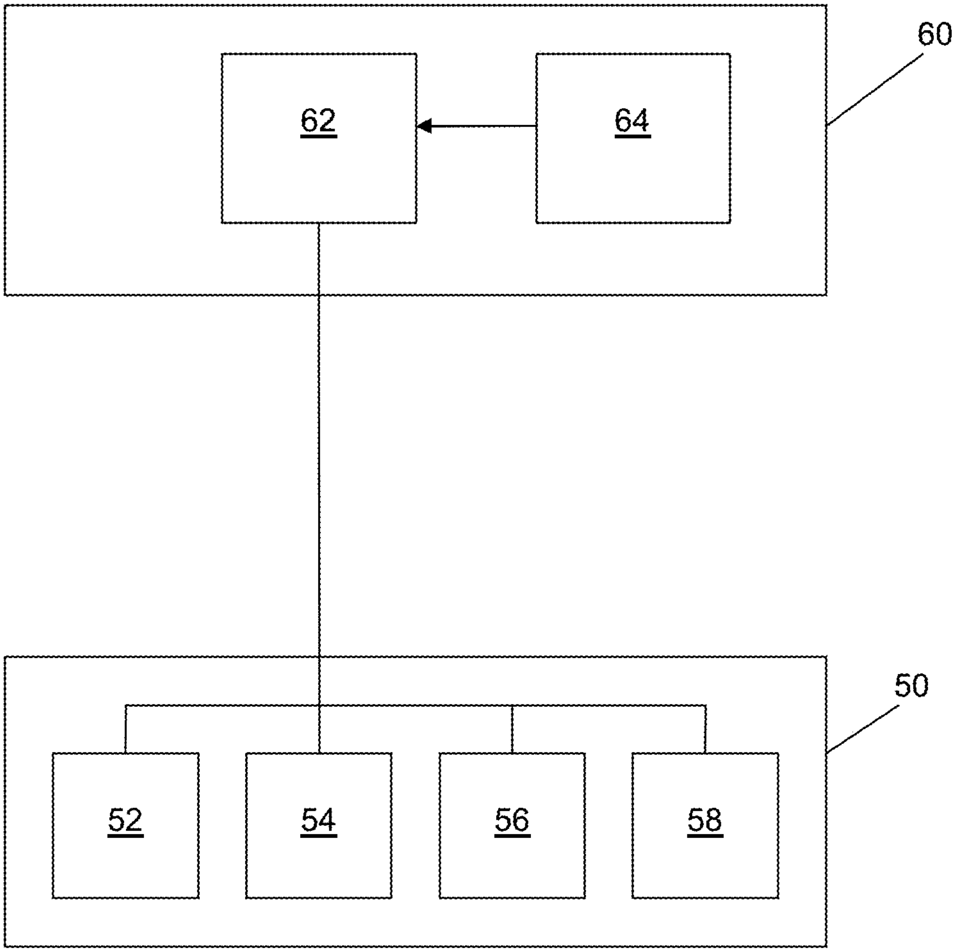
FIG. 1 is a block diagram of the core components of a gaming system.

Referring to the drawings, there is shown a gaming system having a game controller arranged to implement a game wherein one or more symbols are retained from a previous game outcome and one or more subsequent game outcomes generated including the retained symbols. The retained symbols from a previous game outcome are selected from symbols which contribute to a winning symbols combination in the previous game outcome. In the subsequent game outcome these symbols can contribute to further winning symbol combinations.

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a “thick client” architecture may be used wherein part of the game is executed on a player operable gaming machine and part of the game is executed remotely, such as by a gaming server; or a “thin client” architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, “thick client” mode or “thin client” mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enables a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
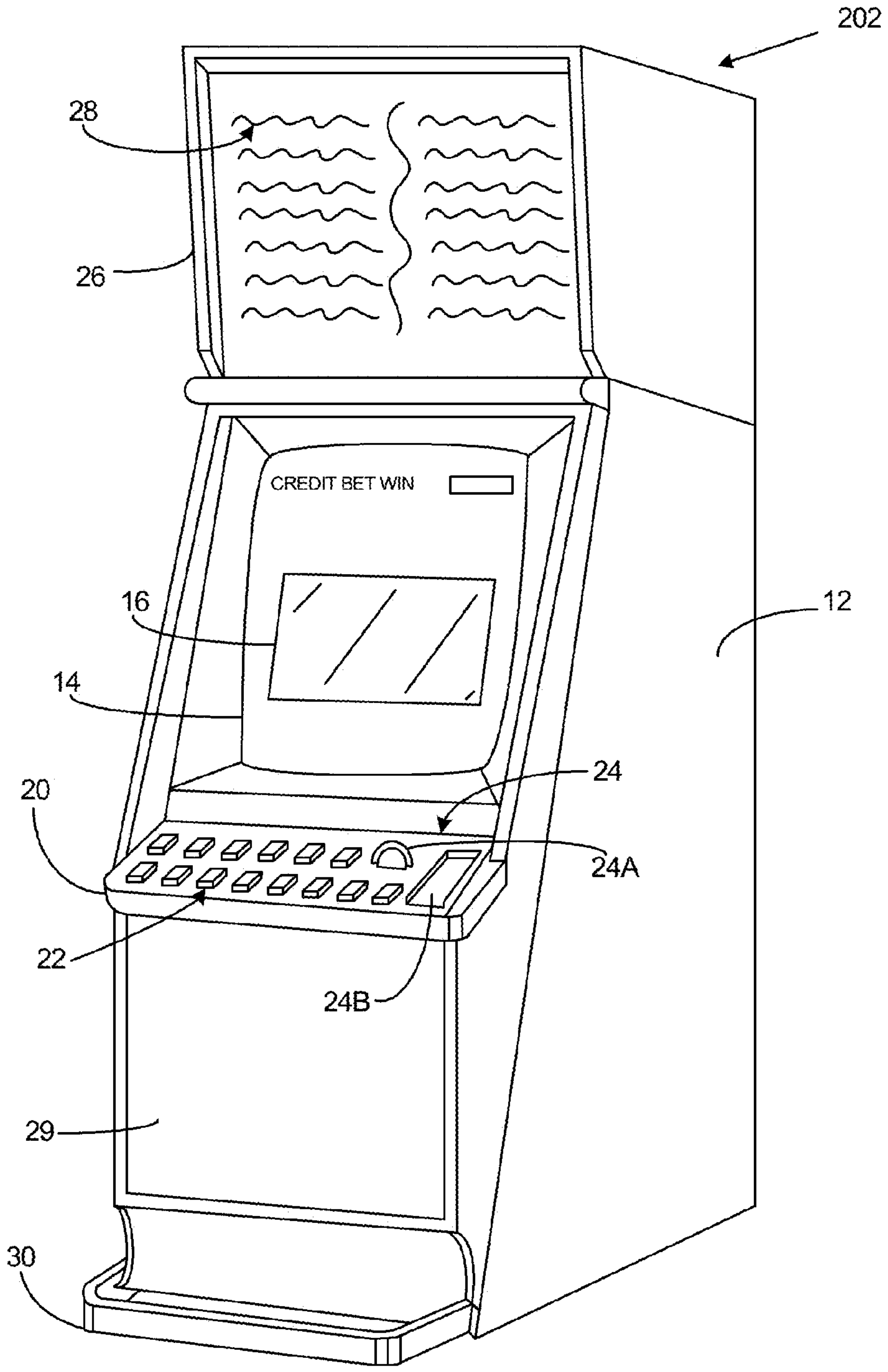
FIG. 2 is a perspective view of a stand alone gaming machine.

A gaming system in the form of a stand alone gaming machine 202 is illustrated in FIG. 2. The gaming machine 202 includes a console 12 having a display 14 on which are displayed representations of a game 16 that can be played by a player. A mid-trim 20 of the gaming machine 202 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticket. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 202.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
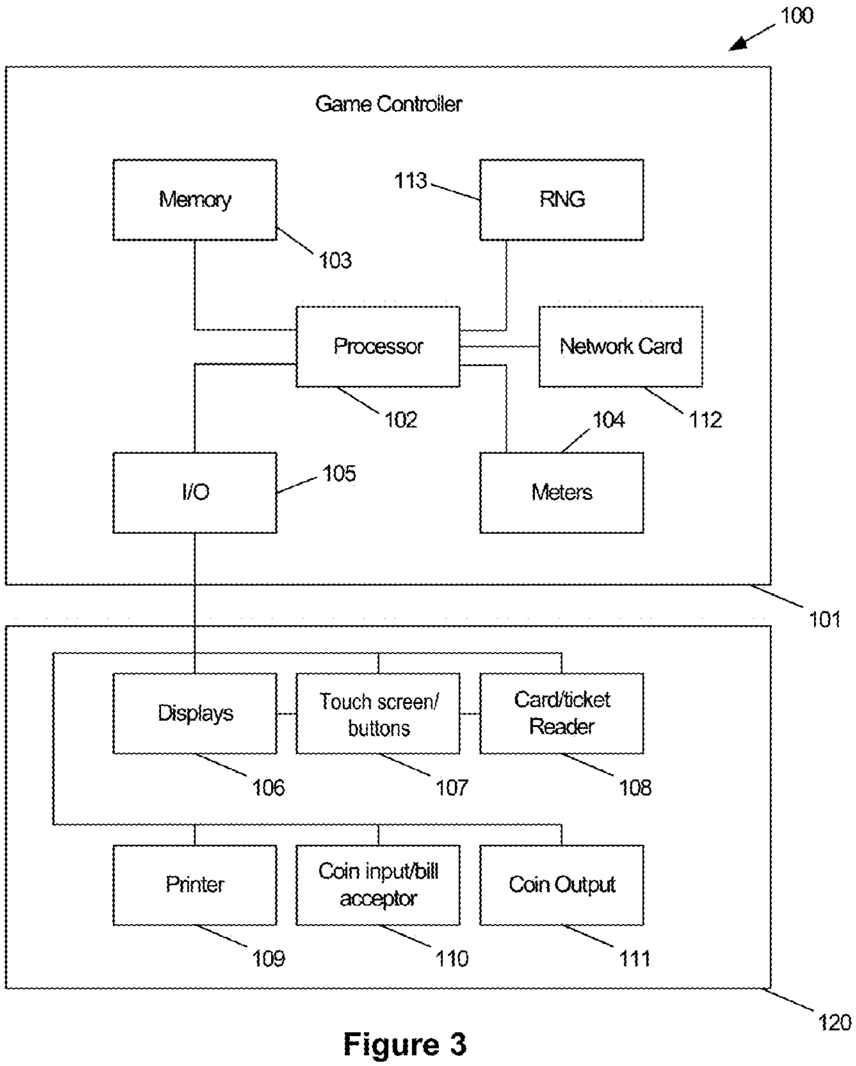
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107 (which provide a game play mechanism), speakers or audio output (not shown), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
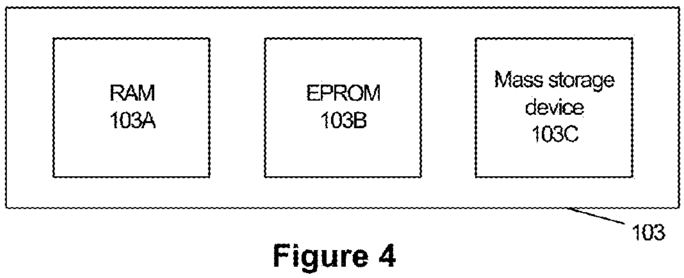
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 1038 may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
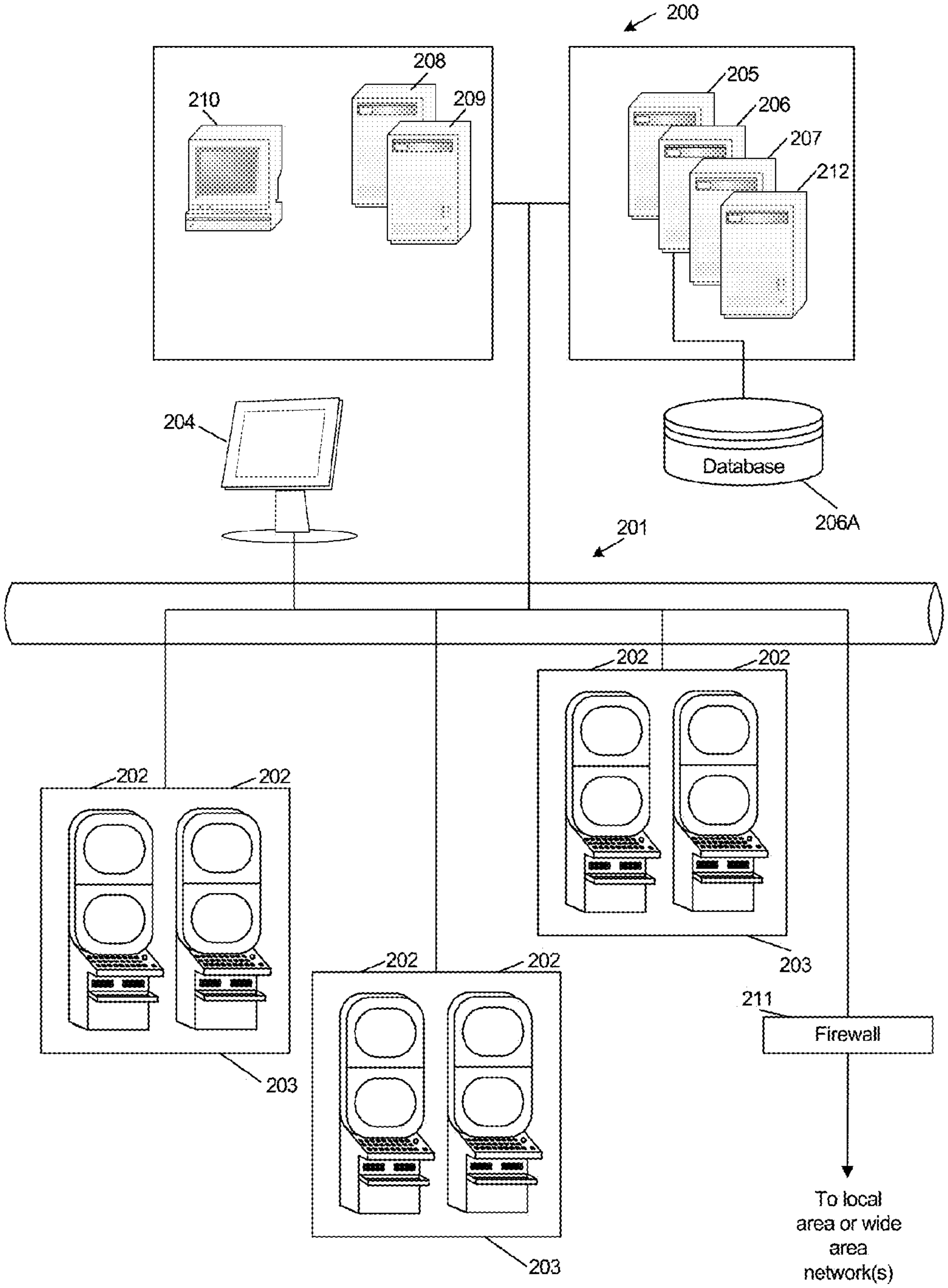
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

The gaming system of the present application implements a gaming method wherein one or more symbols from winning symbols combinations of a game outcome are selected to be retained for inclusion in a symbol set for a subsequently generated game outcome. The retained symbols can contribute to further winning symbol combinations in the subsequent game outcome Embodiments may be applied for a variety of types of games, for example spinning reel, poker or other card dealing games, dice games etc.

The gaming system may implement the gaming method in "feature" game outcomes. For example, one or more feature game outcomes can become available to a player once eligibility criteria are met. For example, a feature game outcome generation sequence may be triggered by a given symbol or symbol combination occurring in a regular game outcome for a base game. Feature game outcomes may be generated as a sequence of "free play" rounds which do not require a wager to be placed. In one variation for the feature game outcomes, a series of feature game outcomes are generated, during which selected symbols are retained. Subsequent feature game outcomes may be generated a number of times until an end condition is met. For example, an end condition may be that a maximum win symbol combination has occurred in the generated game outcome. Alternatively the gaming method may be used for outcomes of regular game play or a player may pay an additional bet to apply the gaming method for a set of game outcomes.

Figure 6:
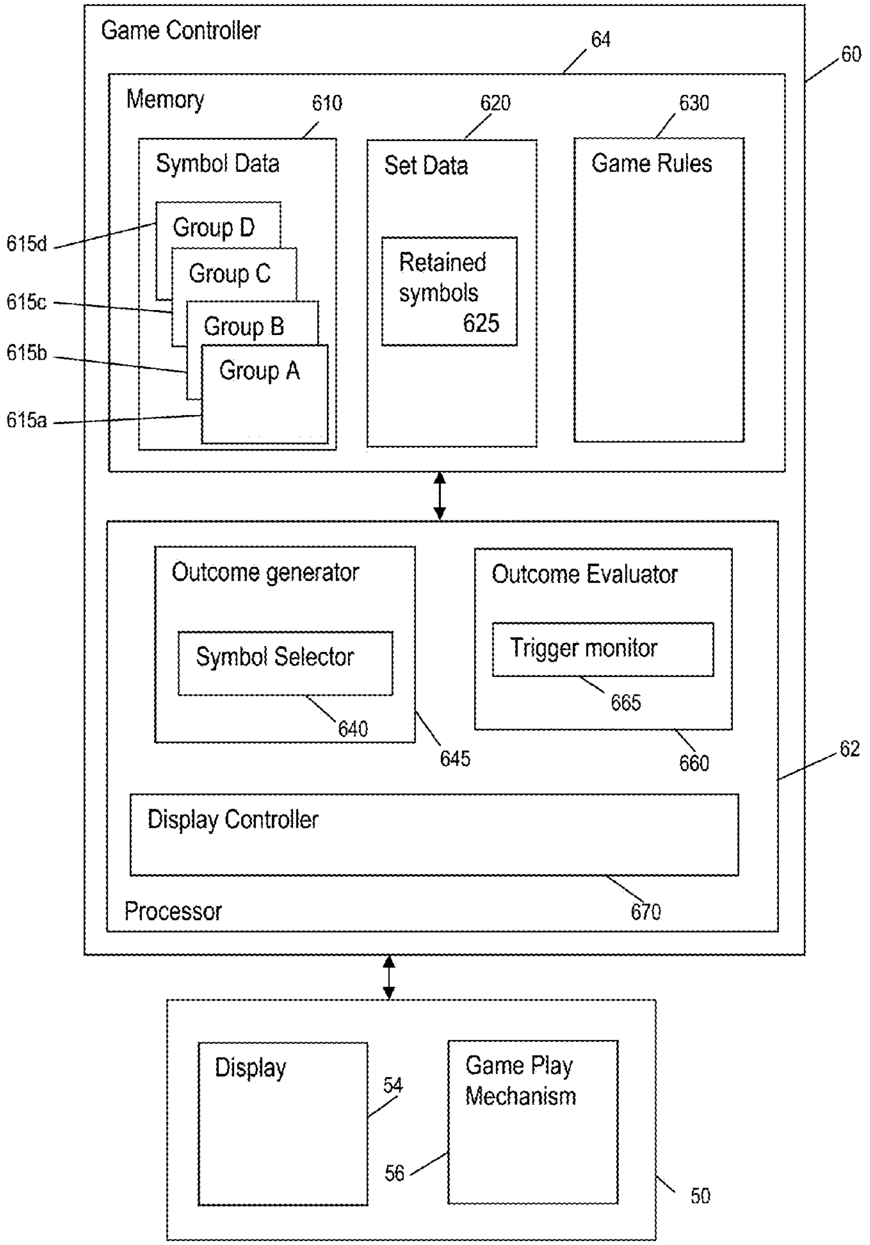
FIG. 6 is a further block diagram of a gaming system.

An embodiment of a gaming system for a spinning reel game is illustrated in FIG. 6. (Where possible the same numbering as FIG. 1 is used.) The gaming system comprises a game controller 60 and a player interface 50. The game controller 60 includes a processor 62 and memory 64. Functions implemented in the game controller 60 include an outcome generator 645 having a symbol selector 640, an outcome evaluator 660 and a display controller 670. The player interface includes a display 54 and game play mechanism 56.

The player inputs game play instructions using the game play mechanism 56. For example, the player may select a number of pay lines and enter an amount to wager per pay line. In initial game outcome is generated in response to the player's instructions. To generate the initial outcome the symbol selector 640 selects symbols from symbol data 610 which comprises a set of available symbols for each of a plurality of groups 615*a-d*. For example, each group 615*a* 615*b* 615*c* 615*d* may specify the configuration of one of a plurality of reels, and the symbol selector may be in the form of a reel controller for selecting stop positions for each reel. In an alternative embodiment each group may represent one of a plurality of dice. In a further alternative embodiment only one group of symbols may be provided, for example representing a deck of cards or pool for a lottery draw.

The display controller 670 is provided with data defining the symbols to display for each group by the symbol selector 640 this data can also include display positions for each symbol or group of symbols. The display controller displays the selected symbol set in accordance with this data on the display 54. Data may also be provided to the display controller by the outcome evaluator 660, for example to cause highlighting of prize winning combinations of symbols on the display 54. The outcome evaluator 660 can also be adapted to increment a win meter or award a prize for a winning combination.

The following process occurs where player is eligible for symbols to be retained from a game outcome, for example if the eligibility criteria for feature game outcomes are met. In some embodiments the outcome evaluator 660 includes a trigger monitor 665 adapted to determine when the eligibility criteria for feature game outcomes is met, for example for an embodiment where the eligibility criteria is a defined symbol or symbol combination occurring in a base game outcome.

The symbol selector 640 selects one or more symbols to retain from the symbol set of the game outcome, and stores retained symbol data 625 in memory 64. The symbols selected are symbols which contribute to winning combinations in the game outcome, for example the symbols of a winning win line of the game outcome or selected symbols form the winning win line which contribute to a winning symbols combination.

The symbol selector then selects a further set of symbols, which includes the retained symbols, in accordance with game rules. For example, the symbol selector 640 selects symbols from symbol data 610 for each of the plurality of groups 615*a-d* representing a reel based on stop positions for the reel. In an embodiment where the retained symbols are held in position and the reels are represented as spinning behind the retained symbols, a symbol set may be selected using the process described above for the initial game outcome and replace symbols from the set with the retained symbols to form the further symbol set including the retained symbols. Alternatively the number of symbols selected from each group may be reduced by the number of retained symbols from that group and the newly selected symbols added to the retained symbols to form the further symbol set.

The display controller 670 is provided with data defining the symbols to display. For example, in a spinning reel embodiment symbol data may include a graphic icon and display position for each symbol. The display controller 670 displays the selected symbol set in accordance with this data on the display 54 as a further game outcome. In some embodiment the retained symbols may be displayed in their original position in each game outcome or may be displayed in designated positions for each symbol group, for example in the bottom lines of the displayed symbol set. The retained symbols remain in the displayed symbol set and can form part of further winning outcome symbol combinations. The outcome evaluator 660 determines winning symbol combinations in the further game outcome. Data may also be provided to the display controller by the outcome evaluator 660, for highlighting of prize winning combinations of symbols on the display 54.

The outcome evaluator 660 can be further adapted to determine credit values payable for the winning game outcomes in accordance with game rules. The outcome evaluator 660 can also update a player's win meter with the credit values won for a game round. A player's win meter may be updated after each game outcome or at the end of a set of game outcomes, for example at the end of a set of feature game outcomes. The timing of when a player's win meter is updated and which winning outcomes contribute to the credit value added to the win meter are dependent on game rules and may vary between embodiments. For example, where the win meter is updated at the end of a set of game outcomes only winning symbol combinations included in the final game outcome, which will typically include retained symbols, may result in credit value added to the player's win meter. Alternatively, only the highest credit value for a winning symbol combination may be awarded for each game outcome. In other embodiments the player's win meter may be updated each round for every winning symbol combination which occurs. It should be appreciated that by retaining symbols from a winning symbol combination of a previous game outcome in a subsequent game outcome, this increases the likelihood of a further winning symbol combination, earning a higher credit value occurring, in a subsequent game outcome.

Figure 7:
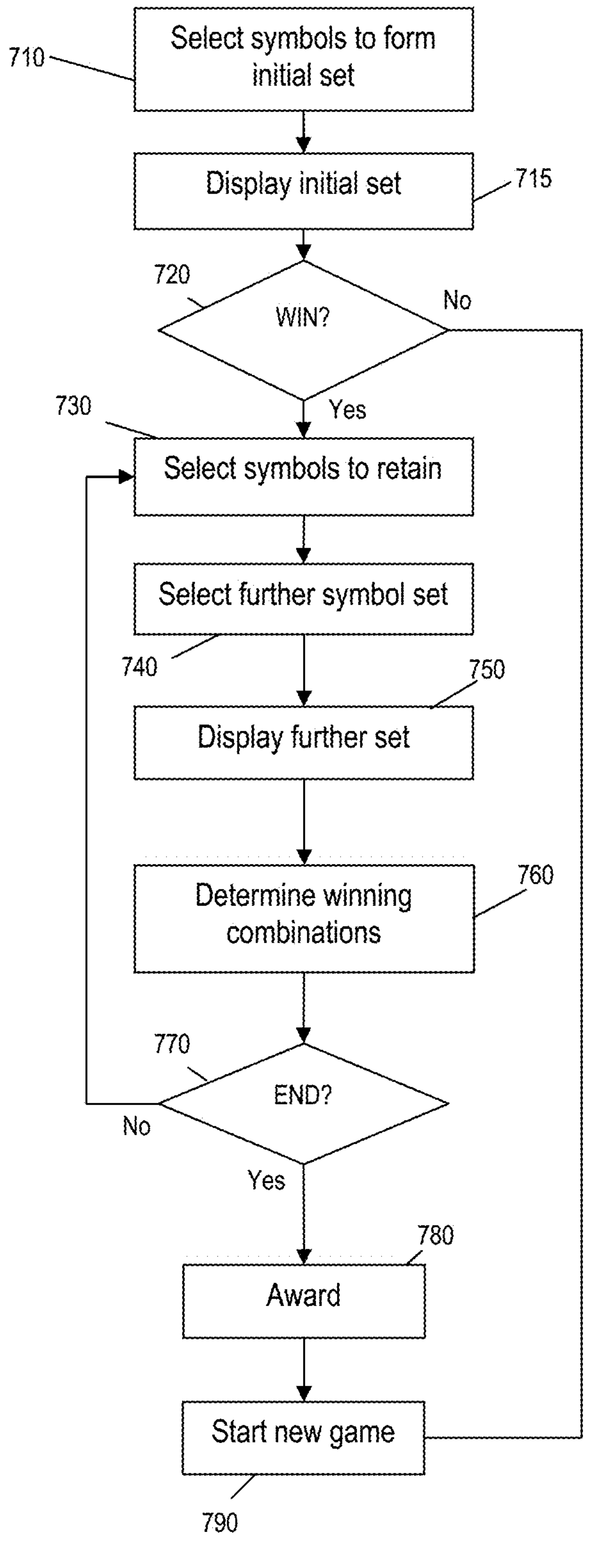
FIG. 7 is a flow chart of an embodiment.

The gaming method will now be described in more detail with reference to FIG. 7 which is a flow chart of a process for executing feature game rounds for a gaming system as described above. The feature game rounds may be triggered from a base game, for example in response to a defined symbol or symbol combination occurring in the base game. Alternatively the feature game rounds may be triggered randomly independent of any specific occurrence in a base game.

An initial game outcome is generated by selecting 710 a set of symbols and displaying 715 the selected symbols as a game outcome. In the illustrated embodiment, if no winning symbol combinations occur in the initial game outcome 720 the feature game rounds end and the player must start a new game 790, which will typically return to the base game. Alternatively, a further initial game outcome may be generated. A player may be allowed a number of initial game outcomes without any winning combinations, say three chances, before the feature rounds end and play returns to the base game.

If one or more winning symbol combinations occur in the initial game outcome 720, symbols are selected from the winning symbol combinations to retain 730. The symbols to retain are selected in accordance with symbols selection criteria defined in game rules. For example, the selected symbols may be all symbols of winning combinations, symbols contributing to a winning combination, such as all symbols of a pay line which includes a winning combination, or symbols from a single winning combination. Alternatively a player may have some input into the selection of the retained symbols. For example, where two winning symbol combinations occur in an initial game outcome and the symbols from only one winning combination can be retained, the player may be offered the opportunity to select which combination they wish to retain for the subsequent game outcome.

A further set of symbols is selected 740, including the retained symbols, and displayed 750 as a subsequent game outcome. The retained symbols may be displayed in the same display positions in the subsequent game outcome as the previous outcome. Alternatively the retained symbols can be displayed in different symbol positions, with in the displayed subsequent game outcome symbol set, based on game rules. For example, retained symbols may be moved to the lowest display positions in the subsequent game outcome, alternatively the retained symbols can be moved to the top, sides or centre of a displayed symbol set. Alternatively the retained symbols may be randomly allocated to different positions in a subsequent symbol set. The positions for the retained symbols in a subsequent game outcome may vary depending on the embodiment. Further, rules for determining display positions for retained symbols may depend on the game type. For example, for a spinning reel game each retained symbol can be retained in a display position associated with the reel from which the symbol was retained, such that the number of symbols displayed from each reel in each game outcome remains constant.

The display positions for the retained symbols may also be based on how winning symbol combinations are determined for a displayed game outcome. For example, if symbol order is important for a winning symbol combination to occur, such as defined pay lines, then rules for displaying retained symbols in subsequent game outcomes may retain aspects of the retained symbols display order from the previous game outcome. Alternatively, where the position or order of the retained symbols is not important to the game rules for determining winning symbol combinations, for example for a card draw or dice game, then there are no restrictions on the display position for the retained symbols.

The game controller determines whether any winning symbol combinations occur in the subsequent game outcome 760. The retained symbols can contribute to winning symbol combinations in the subsequent game outcome. These winning symbol combinations can include the winning symbol combination of the retained symbols from the previous game outcome as well as further winning symbol combinations. Typically a subsequent game outcome will include at least the winning symbol combination comprising the retained symbols. However, in game outcomes where the positions of the retained symbols are altered between the previous and subsequent game outcomes, the winning symbol combination from the previous game outcome may not occur in the subsequent game outcome. The player's win meter may also be updated based on the winning combinations in the game outcome. The game controller can also determine whether the subsequent game outcome is the final game outcome for the sequence 770, for example based on the occurrence of an end condition. If the end condition is not met, then the game controller repeats the process of selecting symbols to retain 730, selecting 740 and displaying 750 further symbol sets, and determining winning combinations 760 until the end of the game outcome generation sequence.

At the end 770 of the game outcome generation sequence, any award due the player for the game outcomes can be determined 780 based on game rules. Once the award is determined this can be added to a player credit balance or paid out to the player and a new game started 790. The award may be based on a cumulative win meter value, which is updated for each game outcome of the sequence or based on awards due for one or more winning symbol combinations in the final subsequent game outcome only. The manner in which awards are determined can vary depending on the embodiment implemented.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

It will be understood to persons skilled in the art of the invention that many modifications may be made without departing from the spirit and scope of the invention, in particular it will be apparent that certain features of the invention can be combined to form further embodiments.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Example 1

In the following non limiting example a player is playing a spinning reel game. A player triggers a series of three feature game outcomes from a base game. During the feature game outcomes the play of the game is free.

According to game rules during the feature game outcomes symbols of a winning outcome are held in position and can contribute to further winning combinations in subsequent feature game outcomes. Game rules define that a prize awarded for the feature game outcomes is determined based on the winning combinations appearing in the final feature game outcome.

A game outcome generated for the first free reel spin is illustrated in FIG. 8*a*. The symbols on the reels 801 include a winning symbol combination of a royal flush in the form of symbols 'A' 810, 'K' 811, 'Q' 812, 'J' 813 and '10' 814. The credit value of a prize for the flush is one hundred credits. These symbols 810-814 are held in position for the next free reel spin.

A game outcome generated for the second free reel spin is illustrated in FIG. 8*b*. The symbols on the reels 802 include the winning symbol combinations of the royal flush 810-814 from the first free spin and a new winning symbol combination of a full house in the form of symbols 'K' 820, 'K' 811, 'J' 821, 'J' 813 and 'J' 823. The credit value of a prize for the full house is eighty credits. It can be seen from the reels 802 that two of the symbols 'K' 811 and 'J' 813 from the winning symbol combination of the previous reel spin outcome are included in the new winning combination. Symbols of both winning combinations are held in position for the next free spin.

A game outcome generated for the third free reel spin is illustrated in FIG. 8*c*. The symbols on the reels 803 include the winning symbol combinations of the royal flush and full house from the first and second free spins and a new winning symbol combination of four of a kind in the form of four sixes 830-833. The credit value of a prize for the four of a kind is fifty credits.

A prize is awarded for the feature game outcomes based on the three winning symbol combinations, in this case the sum of the credit values for each of the winning combinations. Making the total prize awarded for the feature games two hundred and thirty credits, being the sum of one hundred credits for the flush, eighty credits for the full house and fifty credits for four of a kind. Play can then return to the base game.

In this case the player would have received the same prize value if the prizes for winning combinations in each game outcome were awarded progressively after each feature game outcome for each new winning combination added.

Example 2

In the following non limiting example a player is playing a spinning reel game. A player triggers a series of four feature game outcomes from a base game. During the feature game outcomes the play of the game is free.

According to game rules during the feature game outcomes symbols of a winning outcome are dropped to positions at the bottom for subsequent outcomes and can contribute to further winning combinations in subsequent feature game outcomes. Game rules define that a prize awarded for the feature game outcomes is determined based on the winning combinations appearing in the final feature game outcome.

A game outcome generated for the first free reel spin is illustrated in FIG. 9*a*. The symbols on the reels 901 include a winning symbol combination of a royal flush in the form of symbols 'A' 910, 'K' 911, 'Q' 912, 'J' 913 and '10' 914. The credit value of a prize for the flush is one hundred credits. These symbols 910-914 are dropped to bottom positions of the outcome for the next free reel spin.

A game outcome generated for the second free reel spin is illustrated in FIG. 9*b*. The symbols on the reels 902 include the winning symbol combinations of the royal flush 910-914 from the first free spin in a pay line at the bottom of the outcome and a new winning symbol combination of a full house in the form of symbols 'A' 910, 'A' 920, 'A' 921, '10' 922 and '10' 914. The credit value of a prize for the full house is eighty credits. It can be seen from the reels 902 that two of the symbols 'A' 910 and '10' 914 from the winning symbol combination of the previous reel spin outcome are included in the new winning combination.

The symbols of both winning combinations now pile up at the bottom of the outcome for the next free spin. Note that in this case the change of symbols positions destroys the full house of the second winning combination leaving only a pair 'A' 920, 'A' 921 and '10' 922 on a pay line. However these symbols 920-922 remain and can contribute to a further winning combination in a subsequent feature game outcome.

A game outcome generated for the third free reel spin is illustrated in FIG. 9*c*. The symbols on the reels 903 include the winning symbol combination of the royal flush 910-914 from the first free spin in a pay line at the bottom of the outcome and a new winning symbol combination of a pair in the form of symbols 'A' 930 and 'A' 931. The credit value of a prize for a pair is ten credits. The symbols of the pair are dropped and pile up at the bottom of the outcome for the next free spin.

A game outcome generated for the fourth free reel spin is illustrated in FIG. 9*d*. The symbols on the reels 904 include the winning symbol combination of the royal flush 910-914 from the first free spin in a pay line at the bottom of the outcome. Due to the pair symbols 930, 931 piling up at the bottom of the outcome, a new winning symbol combination of four of a kind in the form of symbols 'A' 930, 'A' 920, 'A' 921, and 'A' 931. The credit value of a prize for four of a kind is fifty credits. A prize of ten credits can also be paid for the WILD symbol 940 appearing in the outcome.

A prize is awarded for the feature game outcomes based on the winning symbol combinations appearing in the final game outcome 904, in this case the sum of the credit values of one hundred credits for the flush, fifty credits for four of a kind and ten credits for the wild. Making the total prize awarded for the feature games one hundred and ninety credits. Play can then return to the base game.

In this case the player would have received a different prize value if the prizes for winning combinations in each game outcome were awarded progressively after each feature game outcome for each new winning combination added.

Example 3

In the following non limiting example a player is playing a spinning reel game. A player triggers a series of three feature game outcomes from a base game. During the feature game outcomes the play of the game is free.

According to game rules during the feature game outcomes symbols of the highest prize value winning outcome are held in position and can contribute to further winning combinations in subsequent feature game outcomes. If a higher value winning outcome occurs, then the symbols of this further higher value winning outcome are held for subsequent game outcomes. Game rules define that a prize awarded for the feature game outcomes is determined based on winning symbol combinations appearing in the final feature game outcome.

A game outcome generated for the first free reel spin is illustrated in FIG. 10*a*. The symbols on the reels 1001 include a winning symbol combination of in the form of two 'cherries' symbols 1010, 1011 and a 'WILD' 1012. The credit value of a prize for this combination is thirty credits. These symbols 1010-1012 are held in position for the next free reel spin.

A game outcome generated for the second free reel spin is illustrated in FIG. 10*b*. The symbols on the reels 1002 include the winning symbol combination 1010-1012 from the first free spin and a new winning symbol combination of two 'orange' symbols 1020, 1021 and a 'WILD' 1022. The credit value of a prize for this combination is twenty credits. As the first symbol combination has a higher credit value the second winning symbol combination 1020-1022 is dropped and only the first symbol combination held for the next free spin.

A game outcome generated for the third free reel spin is illustrated in FIG. 10*c*. The symbols on the reels 1003 include the winning symbol combinations the winning symbol combination 1010-1012 from the first free spin and a new winning symbol combination of three 'apple' symbols 1030-1032. The credit value of a prize for the new symbol combination 1030-1032 is fifty credits.

A prize is awarded for the feature game outcomes based on the two winning symbol combinations in the final outcome, in this case eighty credits being the sum of the credit values for each of the winning combinations. Play can then return to the base game.

In this case the held winning symbol combination sets a minimum prize value for the feature game outcomes.

In an alternative award scheme a cumulative prize may be determined based on the winning combinations appearing in each feature game outcome. For example, accumulating thirty credits for the outcome of the first reel spin, fifty credits for the outcome of the second reel spin, and eighty credits for the outcome of the third reel spin to give a total of one hundred and sixty credits for the feature game outcomes.

Example 4

In the following non limiting example a player is playing a spinning reel game. A player triggers a series of three feature game outcomes from a base game. During the feature game outcomes the play of the game is free.

According to game rules during the feature game outcomes symbols of the highest prize value winning outcome are held for a subsequent game outcome. The held symbols are dropped to display positions at the bottom of the game outcome where they can contribute to further winning combinations in subsequent feature game outcomes. If a higher value winning outcome occurs, then the symbols of this further higher value winning outcome are held for subsequent game outcomes. Game rules define that a prize awarded for the feature game outcomes is determined based on winning symbol combinations appearing in the final feature game outcome.

A game outcome generated for the first free reel spin is illustrated in FIG. 11*a*. The symbols on the reels 1101 include a winning symbol combination of in the form of two 'cherries' symbols 1110, 1111 and a 'WILD' 1112. The credit value of a prize for this combination is thirty credits. These symbols 1110-1112 are dropped to bottom positions for the next free reel spin.

A game outcome generated for the second free reel spin is illustrated in FIG. 11*b*. The symbols on the reels 1102 includes a new winning symbol combination of three 'cherries' symbols 1120-1122. The credit value of a prize for this combination is thirty credits. The symbols 1102 also include a new winning symbol combination comprising one 'cherries' symbol 1120 from the new winning symbol combination and the symbols 1110-1112 retained from the first free spin to give a combination of three 'cherries' symbols 1120, 1110. 1111 and 'WILD' symbol 1112. The credit value of a prize for this combination is fifty credits. This new symbol combination is retained for the next free spin as it has a higher credit value than the other new symbol combination.

A game outcome generated for the third free reel spin is illustrated in FIG. 11*c*. The symbols on the reels 1003 includes the winning symbol combination retained from the second outcome and a new winning symbol of three 'orange' symbols 1130-1132. The credit value of a prize for the new symbol combination 1130-1132 is thirty credits.

A prize is awarded for the feature game outcomes based on the two winning symbol combinations in the final outcome, in this case eighty credits being the sum of the credit values for each of the winning combinations. Play can then return to the base game.

In this case the held winning symbol combination sets a minimum prize value for the feature game outcomes.

In an alternative award scheme a cumulative prize may be determined based on the winning combinations appearing in each feature game outcome. For example, accumulating thirty credits for the outcome of the first reel spin, eighty credits for the outcome of the second reel spin, and eighty credits for the outcome of the third reel spin to give a total of one hundred and ninety credits for the feature game outcomes.

Example 5

In the following non limiting example a player is playing a game have a base game from which feature game outcomes can be triggered. The feature game outcomes are card deal outcomes. The base game may also be a card dealing game or may be another type of game. During the feature game outcomes the play of the game is free.

According to game rules during the feature game outcomes symbols of the highest prize value winning outcome are held for a subsequent game outcome. Winning symbol combinations are not dependent on the order in which the symbols appear in a dealt hand. The held symbols can contribute to further winning combinations in subsequent feature game outcomes. Game rules define that a prize awarded for the feature game outcomes is determined based on winning symbol combinations appearing in the final feature game outcome.

Figure 12A:
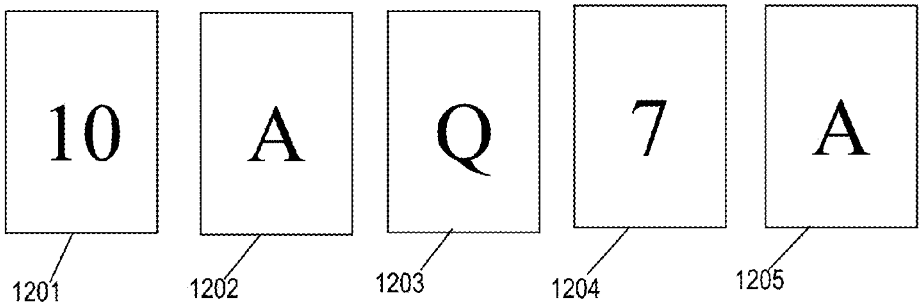
FIGS. 12*a*-12*c* illustrate game outcomes of a fifth example.

A game outcome generated for the first deal is illustrated in FIG. 12*a*. The five dealt cards 1201-1205 include a winning symbol combination of in the form of a pair of aces 1202, 1205. The credit value of a prize for this combination is thirty credits. These cards 1202, 1205 are held for a subsequent deal.

Figure 12B:
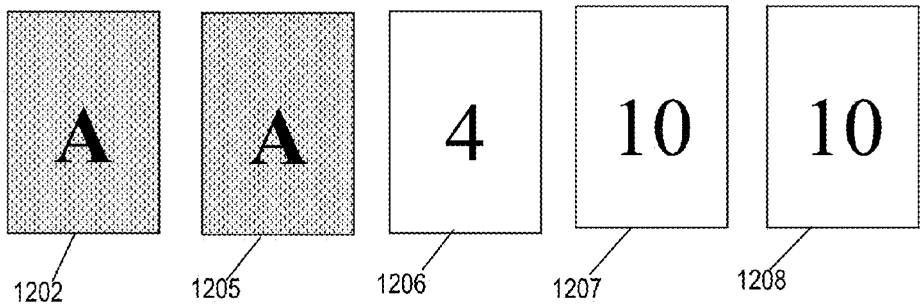

A game outcome generated for the second deal is illustrated in FIG. 12*b*. This outcome includes the retained aces 1202, 1205 and three new cards 1206-1208 which includes a further winning combination of a pair of tens 1207, 1208. The credit value of a prize for this further combination is thirty credits. The pair of aces 1202, 1205 and pair of tens 1207, 1208 are held for a subsequent deal.

Figure 12C:
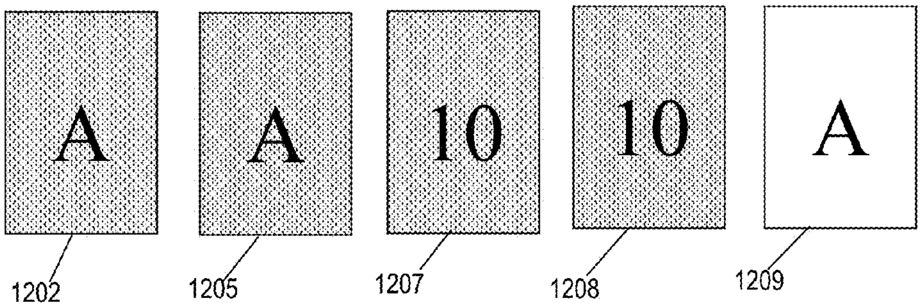

A game outcome generated for the second deal is illustrated in FIG. 12*c*. This outcome includes the retained aces 1202, 1205 and tens 1207, 1208, and a new card 1209 which is a further ace. The game outcome includes a winning combination of a full house comprising three aces 1202, 1205, 1209 and pair of tens 1207, 1208. The prize for a full house is one hundred credits. The prize value of one hundred credits is awarded to the player and play continues with the base game.

Example 6

In the following non limiting example a player is playing a spinning reel game. A player triggers a series of three feature game outcomes from a base game. During the feature game outcomes the play of the game is free.

According to game rules during the feature game outcomes symbols of one winning outcome are held in position and can contribute to further winning combinations in subsequent feature game outcomes. Where more than one winning symbol combination occurs in an outcome the player can choose which outcome to retain. Game rules define that a prize awarded for the feature game outcomes is determined based on winning symbol combinations appearing in the final feature game outcome.

A game outcome generated for the first free reel spin is illustrated in FIG. 13*a*. The symbols on the reels 1301 include a winning symbol combination of in the form of two 'cherries' symbols 1310, 1311. The credit value of a prize for this combination is ten credits. As this is the only winning symbol combination, these symbols 1310, 1311 are held in position for the next free reel spin.

A game outcome generated for the second free reel spin is illustrated in FIG. 13*b*. The symbols on the reels 1302 include a first winning symbol combination of the two 'cherries' symbols 1310, 1311 from the first free spin and a 'WILD' symbol 1320, and a second winning symbol combination of three 'orange' symbols 1321-1323. The credit value of a prize for each of the first and second combinations is thirty credits. The player can then select one of the symbol combinations to retain for the next outcome. The player chooses to retain the second winning symbol combination of three orange symbols 1321-1323 so this symbol combination is held for the next free spin.

A game outcome generated for the third free reel spin is illustrated in FIG. 13*c*. The symbols on the reels 1303 include the winning symbol combination of four 'orange' symbols, comprising the three retained 'orange' symbols 1321-1323 and a new 'orange' symbol 1340. The credit value of a prize for this symbol combination is fifty credits. The game outcome includes no other winning symbol combinations.

A prize is awarded for the feature game outcomes based on the winning symbol combinations in the final outcome, in this case so the prize of fifty credits for the one final winning outcome.

In this case the player selects the held winning symbol combination which sets a minimum prize value for the feature game outcomes when more than one winning outcome occurs. This enables the player to have greater involvement in the feature game outcomes and potentially increase the player enjoyment.

In an alternative award scheme a cumulative prize may be determined based on the winning combinations appearing in each feature game outcome. For example, accumulating ten credits for the outcome of the first reel spin, sixty credits for the outcome of the second reel spin, and fifty credits for the outcome of the third reel spin to give a total of one hundred and twenty credits for the feature game outcomes.

The invention claimed is:

1. A method of gaming for use with a gaming machine having a credit input mechanism configured to receive a wager in the form of a physical item representing a monetary value for receiving a credit input and establishing a credit balance, the credit balance being increasable and decreasable based at least on wagering activity, a payout mechanism configured to cause a payout associated with the credit balance, a controller having a random number generator configured to generate a random number, a manually operable player interface configured to place a wager, in accord with said credit balance, and receive player selection, and a game display having a plurality of display positions, the method comprising:

establishing a credit balance via said credit input mechanism receiving the physical item;

in accord with having established the credit balance, selecting via the random number generator a first game outcome having a plurality of symbols for display on the game display;

displaying at the plurality of display positions the first game outcome formed with the selected symbols;

determining via the game controller and awarding a first prize if the first game outcome includes a first winning symbol combination being formed by a first plurality of symbols and having a prize value;

selecting via the random number generator the first winning symbol combination of symbols to be moved to a predetermined first plurality of the display positions for a subsequent game outcome;

selecting via the random number generator a further set of symbols for display as a subsequent game outcome including the moved first winning symbol combination of symbols at the predetermined first plurality of the display positions;

displaying on the game display the subsequent game outcome;

determining via the game controller and awarding a second prize if the subsequent game outcome includes a second winning symbol combination based on at least one of the second plurality of symbols;

displaying at the display positions the second winning symbol combination at a predetermined second plurality of the display positions for a further subsequent game outcome;

selecting a further set of symbols for display as a further subsequent game outcome including the moved first winning symbol combination and the second winning symbol combination;

meeting via the game controller an end condition; and paying out value via said payout mechanism in accordance with the credit balance based on the first prize and the second prize.

2. A method as claimed in claim 1, further comprising awarding the prize value based on the first winning symbol combination.

3. A method as claimed in claim 1, and wherein the second winning symbol combination of the subsequent game outcome includes one or more of the first winning symbol combination.

4. A method as claimed in claim 1, and wherein the moved first winning symbol combination of symbols relate to a highest winning symbol combination of the first game outcome.

5. A method as claimed in claim 1, and wherein the moved first winning symbol combination of symbols relate to a player-selected winning symbol combination of the game outcome.

6. A method as claimed in claim 1, and wherein the second winning symbol combination include symbols of the moved first winning symbol combination of symbols.

7. A method as claimed in claim 1, and wherein the predetermined second plurality of the display positions are independent of the predetermined first plurality of the display positions.

8. A method as claimed in claim 1, and wherein the end condition is a given number of repetitions.

9. A method as claimed in claim 1, and wherein the end condition is a given game outcome occurring.

10. A game machine comprising:

a credit input mechanism configured to receive a wager in the form of a physical item representing a monetary value for receiving a credit input and establishing a credit balance, the credit balance being increasable and decreasable based at least on wagering activity;

a payout mechanism configured to cause a payout associated with the credit balance;

a manually operable player interface configured to place a wager, and in accord with said credit balance, receive player selection;

a game display having a plurality of display positions, and a controller having a random number generator configured to generate a random number, and configured to select a first game outcome having a plurality of symbols of a game outcome for display on the game display, cause the display to display at the plurality of display positions the first game outcome formed with the selected symbols, determine and award a first prize if the first game outcome includes to a first winning symbol combination being formed by a first plurality of symbols in the game outcome and having a prize value, select the first winning symbol combination of symbols to be moved to a predetermined first plurality of the display positions for a subsequent game outcome, select a further set of symbols for display as a subsequent game outcome including the moved first winning symbol combination of symbols at the predetermined first plurality of the display positions, cause the display to display on the game display the subsequent game outcome, determine and award a second prize if the subsequent game outcome includes a second winning symbol combination based on at least one of the second plurality of symbols, cause the display to display at the display positions the second winning symbol combination at a predetermined second plurality of the display positions for a further subsequent game outcome, select a further set of symbols for display as a further subsequent game outcome including the moved first winning symbol combination and the second winning symbol combination;

meet an end condition, and cause said payout mechanism to pay out in accordance with the credit balance based on the first prize and the second prize.

* * * * *